United States Patent

Matsumoto et al.

[11] Patent Number: 5,845,719
[45] Date of Patent: Dec. 8, 1998

[54] VIBRATING CUTTING MACHINE

[75] Inventors: Isao Matsumoto; Masao Ohkanda, both of Tokyo, Japan

[73] Assignee: Kioritz Corporation, Tokyo, Japan

[21] Appl. No.: 838,390

[22] Filed: Apr. 19, 1997

Related U.S. Application Data

[63] Continuation of Ser. No. 570,812, Dec. 12, 1995, abandoned, which is a continuation of Ser. No. 301,715, Sep. 7, 1994, abandoned, which is a continuation of Ser. No. 144,224, Oct. 28, 1993, abandoned, which is a continuation of Ser. No. 941,988, Sep. 8, 1992, abandoned.

[30] Foreign Application Priority Data

Sep. 17, 1991 [JP] Japan ................................ 3-83218 U

[51] Int. Cl.$^6$ ............................ B23B 45/00; B25D 17/04
[52] U.S. Cl. ........................ 173/114; 173/205; 173/170; 172/20; 16/112; 83/628; 30/273
[58] Field of Search ..................................... 173/114, 205, 173/170, 4, 10, 11, 18, 19, 168, 169, 122, 90, 210, 162.2; 30/273, 275, 392, 394, 167, 167.1, 167.2; 83/628; 172/19, 20; 404/133.1; 16/110 R, 112

[56] References Cited

U.S. PATENT DOCUMENTS

| | | | |
|---|---|---|---|
| 793,295 | 6/1905 | Gury | 30/275 |
| 824,480 | 6/1906 | Hastings | 30/275 |
| 976,801 | 11/1910 | Henderson | 30/394 |
| 1,838,459 | 12/1931 | Smith et al. | 173/19 X |
| 1,887,762 | 11/1932 | Horton | 173/205 |
| 2,619,132 | 11/1952 | Pierce | 30/394 |
| 2,639,892 | 5/1953 | Jones | 173/19 X |
| 2,702,502 | 2/1955 | Rogneby | 172/19 |
| 2,826,176 | 3/1958 | Chellis et al. | 173/18 X |
| 3,270,369 | 9/1966 | Mandell | 30/394 |
| 3,712,389 | 1/1973 | Smoak | 173/90 X |
| 3,734,202 | 5/1973 | Guongyosi | 173/4 X |
| 4,036,085 | 7/1977 | Sjostrand et al. | 82/52.3 |
| 4,205,439 | 6/1980 | Sweet | 30/276 |
| 4,576,241 | 3/1986 | Emonet | 173/170 |
| 4,637,539 | 1/1987 | Turcott et al. | 227/156 |
| 4,643,263 | 2/1987 | Karden | 173/170 X |
| 4,674,185 | 6/1987 | Gardner | 30/122 |
| 4,856,394 | 8/1989 | Clowers | 83/56 |
| 5,009,012 | 4/1991 | Martinez et al. | 30/273 |
| 5,031,395 | 7/1991 | Ohkanda et al. | 56/236 |
| 5,044,568 | 9/1991 | Shigemizu | 173/170 X |
| 5,111,582 | 5/1992 | Pieroni | 30/225 |
| 5,287,582 | 2/1994 | Kawai et al. | 173/205 |

*Primary Examiner*—Rinaldi I. Rada
*Assistant Examiner*—Boyer Ashley
*Attorney, Agent, or Firm*—Bauer & Schaffer

[57] ABSTRACT

An elongated rod is journalled in a housing to reciprocate substantially vertical therefrom and has a cutting blade fixed on the tip of the lower end of the rod. A rotary motor is located at the upper end of the housing and is provided with an eccentric cam for converting the rotary motion into linear reciprocating motion.

7 Claims, 4 Drawing Sheets

5,845,719

VIBRATING CUTTING MACHINE

This is a Continuation of Ser. No. 08/570,812, filed Dec. 12, 1995, now abandoned, which is a Continuation of Ser. No. 08/301,715, filed Sep. 7, 1994, now abandoned, which is a Continuation of Ser. No. 144,224, filed Oct. 28, 1993, now abandoned, which is a Continuation of Ser. No. 07/941,988, filed Sep. 8, 1992, now abandoned.

FIELD OF THE INVENTION

This invention relates to an apparatus for cutting turf and the like and particularly to a vibrating cutting-machine operating a cutting blade by reciprocating it up and down. The cutting-machine can be used, for example, for cutting turf in golf courses.

BACKGROUND OF THE INVENTION

In golf courses, turf is cut into a square of an appropriate size in order to replant the turf.

Heretofore, this cutting has been generally made using a rotary blade brush cutter, a clipper-type brush cutter or the like. The rotary blade brush cutter has a blade rotating in high speed at the tip of an operating rod. It is used by placing the cutting blade vertically against the turf.

On the other hand, the clipper-type brush cutter has reciprocating blades consisting of a pair of upper and lower blades so that cutting is made by reciprocating movement of the upper and lower blades in the opposite directions along a longitudinal line. In operation, the reciprocating blades are placed vertically against the turf with both the upper and lower blades side by side.

The rotary blade brush cutter is hazardous to human life in that pebbles are caused to fly around from the ground during the cutting operation due to rotation of the blades in high speed.

The clipper-type brush cutter has the disadvantage that it would bite into the sand and the turf between the blades during operation particularly during use of it on the edge of bunkers. Consequently, the blades are easily damaged and the durability of blades is poor.

BRIEF SUMMARY OF THE INVENTION

The object of this invention is to provide a vibrating cutting-machine for cutting pieces of turf or sod which is safe and has excellent durability, ease of maintenance and more efficient in operation.

To achieve this object, this invention comprises a power converter which converts the rotary motion of a motor into reciprocating motion, a reciprocating rod having the upper end connected to the power converter so as to operate reciprocally up and down and having at the tip of its lower end a blade cutting into the turf.

The power converter is desirably constructed of an eccentric cam attached to a rotary shaft driven by the motor and a connecting rod. The larger end of the rod is connected to the eccentric cam through a bearing and the smaller end is connected, in a freely rotating manner, to a pin provided on the upper end of the reciprocating rod.

Preferably, the cutting blade is formed having a downwardly facing circular arc.

In addition, it may be convenient to add a depth adjusting member which limits the insertion depth of the cutting blade by contact with the turf to be cut.

As mentioned above, the cutting-machine of this invention cuts the turf by the up and down reciprocation of the cutting blade thereby causing the blade to pierce the turf. Therefore, unlike the ordinary rotary blade brush cutter, the cutting-machine of this invention does not saw the ground and cause pebbles to fly around during working of the turf, therefore it is safe.

Also, unlike the ordinary clipper-type brush butter, there is no biting into the sand, therefore the durability of blades is excellent.

Moreover, the operation efficiency is improved by providing the depth adjusting member which enables the cutting blade to be inserted in the ground to a depth desired according to various conditions such as the operation site, posture of operator and the like.

DETAILED DESCRIPTION OF THE INVENTION

Figure 1:
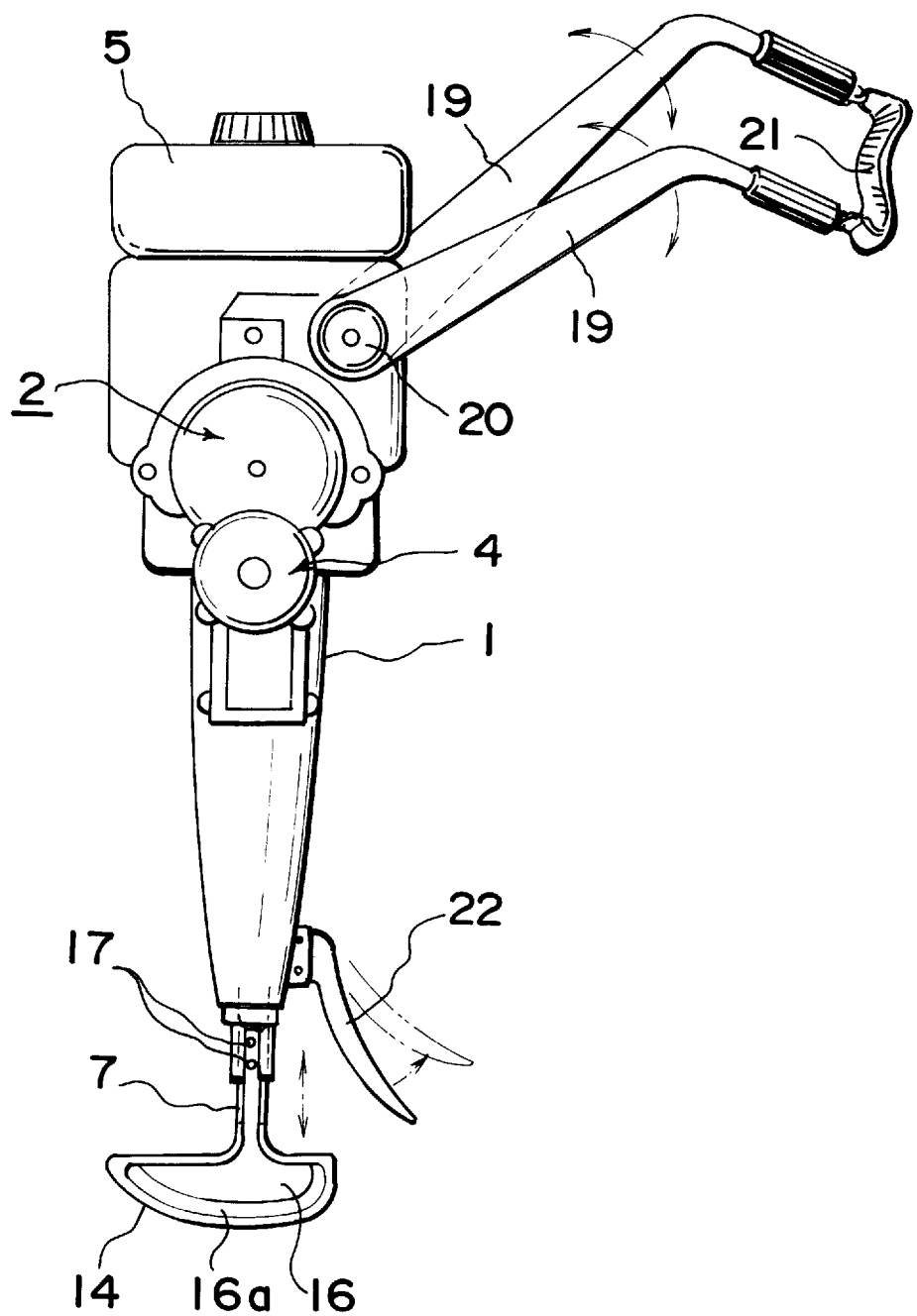
FIG. 1 is a side elevation view of one embodiment of the cutting-machine of the present invention.

As shown in FIG. 1, the cutting-machine of the present invention comprises a housing or main body 1 is provided with a motor 2, for example an air cooled 2-cycle gasoline engine and the like, and a power converter (or transmission) 4, which converts the rotary power of the motor 2 into reciprocating power. The motor and power converter are mounted on the top of the main body 1, above which a fuel tank 5 for the motor 2 is also mounted.

Figure 4:
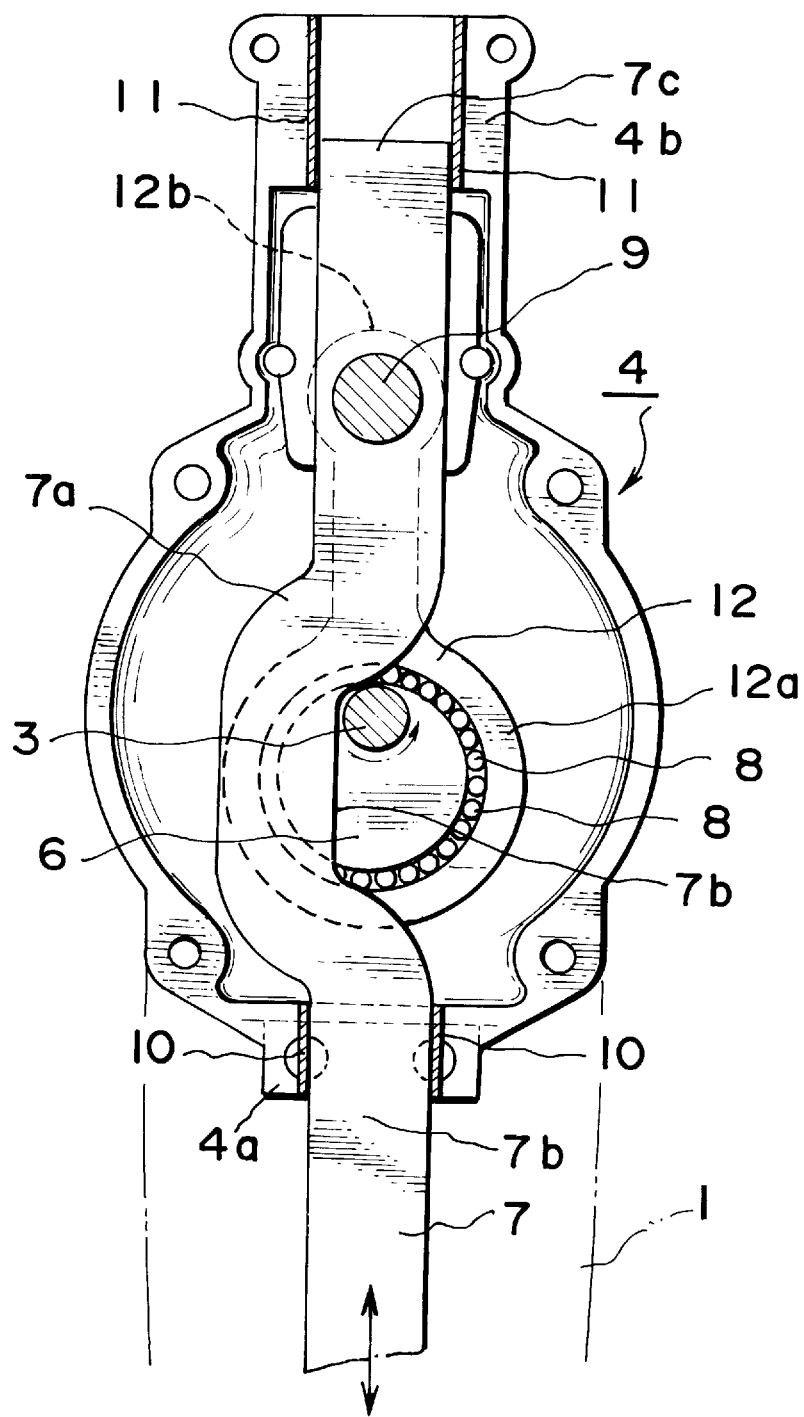
FIG. 4 is a longitudinal section of the power converter for converting the rotary power of the motor into reciprocating power.

As seen in FIG. 4, the power converter 4 comprises the upper portion 7a of a reciprocating rod 7 journalled in and extending through the main body 1, in the vertical direction so that its lower end 7b projects from the main body 1. An eccentric cam 6 is fixed to a rotary shaft 3 driven by the motor 2. A connecting rod 12 having its larger end 12a journalled about the eccentric cam 6 via a bearing 8 and its smaller end 12b journalled about a pin 9 provided on the upper part 7a of the reciprocating rod 7, joins the motor and the reciprocating rod and converts the rotary motion into reciprocating movement of the rod 7.

In the drawing, the upper portion 7a of the reciprocating rod 7 is curved to prevent the reciprocating rod 7 from contacting the rotary shaft 3 during its movement up and down.

Also, to each of the upper end 4b and the lower end 4a of the housing there is provided bearings 11 and 10 in which the reciprocating rod 7 is supported to be freely movable at both its upper section 7c and the lower section 7b.

At the tip end of the reciprocating rod 7 projecting downwards from the main body 1 there is attached, for example by bolts 15, a cutting blade 14 which is formed with an arcuate lower edge preferably in nearly semicircular form.

Also, at the lower end of the main body 1 there is attached a depth adjusting member 16 so that its position is selectively adjustable to control the cutting depth of the cutting blade 14 against the subject turf 13. This depth adjusting member 16 is a long and slender rod or thin plate-like member having its upper end attached to the main body 1 by bolts 17 or the like passing through selected holes in the member 16 for adjustment up and down.

Figure 2:
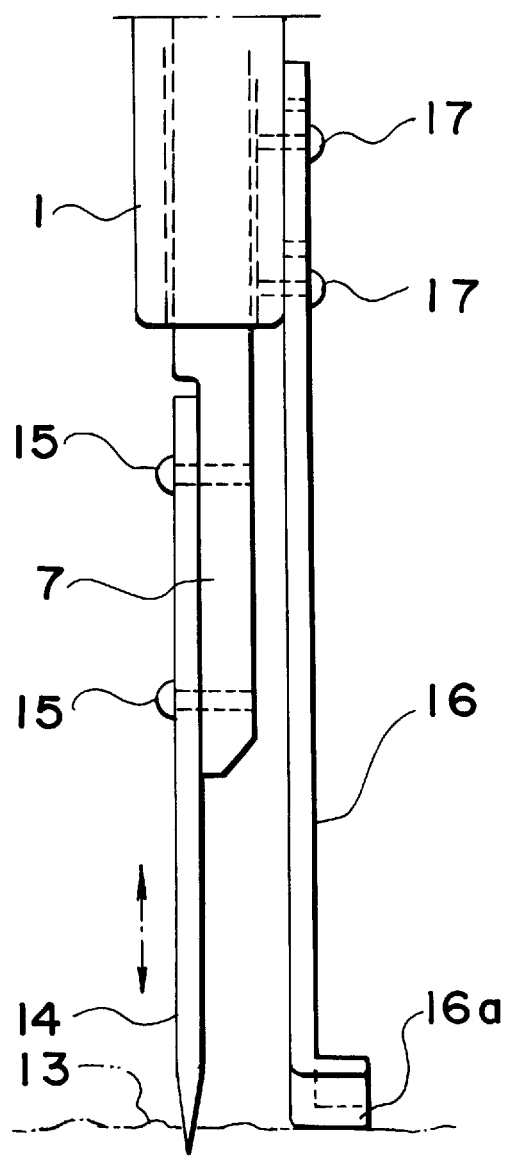
FIG. 2 is a front view showing the cutting blade of FIG. 1.
Figure 3:
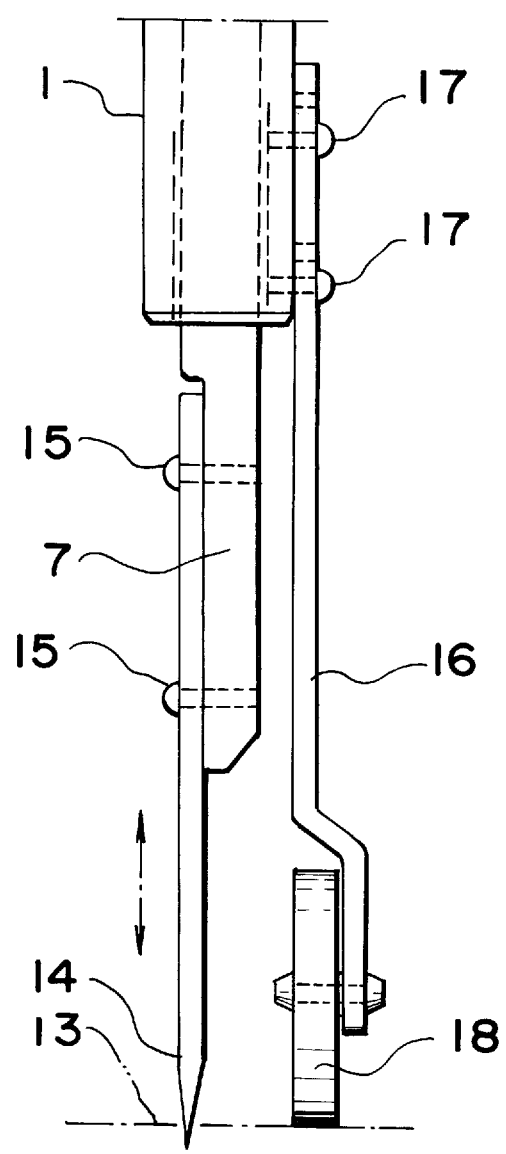
FIG. 3 is a front view showing another embodiment of the cutting blade.

The lower end 16a of the cutting depth adjusting member 16 is bent to form a skid as shown in FIGS. 1 and 2 in order to make its movement easier over the turf. As shown in FIG. 3, the movement of the machine may be made much easier during the operation by providing a roller 18 on the lower end of the depth adjusting member 16 instead of the skid.

In FIG. 1 control handles 19 are fixed to the motor body by the handle fixing knobs 20. The fixing angles of the left and right handles 19 are adjusted separately. Not shown in the drawing, are various control parts such as a throttle lever for the motor 2 all of which may be attached to the control handles 19.

A balancing band 21 enabling the operator to maintain the balance of the machine is provided. The band 21 is used by placing it about or abutting the body of the operator during the operation.

A movable safety plate 22 is provided to protect the feet of the operator. The upper part of the movable safety plate 22 is attached to an appropriate position at the lower end of the main body 1 and on the same side as the control handles 19. The movable safety plate 22 is freely positionable as seen by the arrow in FIG. 1. The reason for making the movable safety plate 22 freely movable back and forth is to allow its functioning according to the ground contour.

The vibrating cutting-machine of this invention is used by holding the control handles 19, standing the main body 1 perpendicularly on the field of a golf course and placing the lower edge 16a of the cutting depth adjusting member 16 on the turf 13 to be cut.

When the motor 2 is started, the shaft 3 rotates the cam 6 thereby causing the connecting rod 12 to move up and down resulting in the reciprocation of rod 7 through the pin 9 up and down. The cutting blade 14 simultaneously moves up and down piercing the turf or sod because it is attached to the lower end of the reciprocating rod 7. By this reciprocation of the cutting blade 14, the subject turf 13 is cut.

By adjusting the position of the depth adjusting member 16, the distance between the lower end 16a of the depth adjusting member 16 and the edge position of said cutting blade 14 can be changed. Consequently, the insertion depth of the cutting blade 14 into the turf 13 can be changed.

Moreover, by forming the lower end of the depth adjusting member 16 as a skid or having installed the roller 18 as mentioned above, the machine is easily movable during the operation.

Also, the movable safety plate 22 prevents the cutting blade 14 from reaching the feet of the operator.

As seen from FIG. 1, the cutting blade 14 may be slightly offset backwards of the reciprocating rod 7. In this manner, operation can be made much easier while leaning the cutter backward and pushing it forwards.

What is claimed is:

1. Portable manually operated apparatus for cutting turf comprising an elongated rod having a longitudinal axis arranged to extend perpendicular to the turf, a housing mounted at an upper end of said rod and a cutter mounted at a lower end of said rod, said housing having a front, a back, and right and left connecting sides, said cutter having a blade substantially transverse to the longitudinal axis of said rod and parallel to said sides for penetrating and cutting said turf along a vertical plane, said elongated rod being journaled at its upper end in said housing for reciprocal movement in the direction of its longitudinal axis, a rotary motor and power converter mounted in said housing, said power converter being directly linked to the upper end of said rod to convert the rotary motion of said motor into constant reciprocating linear motion actuating said rod, a pair of handles, means for pivotally mounting each of said handles at their inner ends independently to the respective right and left connecting sides of said housing and protruding toward a user, said mounting means permitting each handle to be separately adjustable of the other to a number of fixed positions at selected angles relative to the longitudinal axis of said rod, enabling the user to manually raise and lower said right and left connecting sides separately, one from the other, to hold said apparatus most optimally in a perpendicular working position during the constant reciprocation of said actuating rod.

2. The apparatus according to claim 1, wherein said blade is arcuate.

3. The apparatus according to claim 1, wherein the direct linkage of said power converter comprises a circular cam eccentrically fixed to a rotary output shaft of said motor; a connecting rod having a large and a small end, said connecting rod being journaled at its larger end to said eccentric cam through a bearing and being journaled at its small end to the upper end of said elongated rod.

4. The apparatus according to claim 3, wherein the upper end of said rod has a curved edge along its length to avoid contact with said rotary shaft.

5. The apparatus according to claim 1, including a depth adjusting member adjustably fixed at one end to said housing and extending in a direction parallel to the longitudinal axis of movement of said rod, said depth adjusting member having at its other end a contact member engaging a surface of vegetation to be cut so that a depth to which said blade pierces said vegetation can be selected.

6. The apparatus according to claim 5, wherein said contact member comprises a skid.

7. The apparatus according to claim 5, wherein said contact member comprises a roller.

* * * * *